(12) United States Patent
Taubin et al.

(10) Patent No.: US 11,425,358 B2
(45) Date of Patent: Aug. 23, 2022

(54) METHOD AND SYSTEM FOR UNSYNCHRONIZED STRUCTURED LIGHTING

(71) Applicant: Brown University, Providence, RI (US)

(72) Inventors: Gabriel Taubin, Providence, RI (US); Daniel Moreno, Norwich, CT (US); Fatih Calakli, Isparta (TR)

(73) Assignee: BROWN UNIVERSITY, Providence, RI (US)

( * ) Notice: Subject to any disclaimer, the term of this patent is extended or adjusted under 35 U.S.C. 154(b) by 0 days.

(21) Appl. No.: 17/226,920

(22) Filed: Apr. 9, 2021

(65) Prior Publication Data
US 2021/0258558 A1    Aug. 19, 2021

Related U.S. Application Data

(60) Continuation of application No. 16/434,846, filed on Jun. 7, 2019, now abandoned, which is a division of
(Continued)

(51) Int. Cl.
*H04N 13/254*    (2018.01)
*H04N 13/167*    (2018.01)
(Continued)

(52) U.S. Cl.
CPC .......... *H04N 13/254* (2018.05); *G03B 35/02* (2013.01); *G06T 7/521* (2017.01); *H04N 13/167* (2018.05); *G06T 2207/10028* (2013.01)

(58) Field of Classification Search
CPC .... H04N 13/254; H04N 13/167; G03B 35/02; G06T 7/521; G06T 2207/10028
(Continued)

(56) References Cited

U.S. PATENT DOCUMENTS 6,388,654 B1    5/2002    Platzker et al.
7,929,751 B2    4/2011    Zhang et al.
(Continued)

FOREIGN PATENT DOCUMENTS

KR    20130126234 A    11/2013

OTHER PUBLICATIONS

Yi Xu and Daniel G. Aliaga. Robust pixel classification for 3d modeling with structured light. In Proceedings of Graphs Interface 2007, GI '07, pp. 233-240, New York, NY, USA, 2007. ACM.
(Continued)

*Primary Examiner* — Susan E. Torgerson
(74) *Attorney, Agent, or Firm* — Adler Pollock & Sheehan P.C.

(57) ABSTRACT

A system and method to capture the surface geometry a three-dimensional object in a scene using unsynchronized structured lighting is disclosed. The method and system includes a pattern projector configured and arranged to project a sequence of image patterns onto the scene at a pattern frame rate, a camera configured and arranged to capture a sequence of unsynchronized image patterns of the scene at an image capture rate, and a processor configured and arranged to synthesize a sequence of synchronized image frames from the unsynchronized image patterns of the scene. Each of the synchronized image frames corresponds to one image pattern of the sequence of image patterns.

18 Claims, 6 Drawing Sheets

Related U.S. Application Data application No. 15/124,176, filed as application No. PCT/US2015/019357 on Mar. 9, 2015, now abandoned.

(60) Provisional application No. 61/949,529, filed on Mar. 7, 2014.

(51) Int. Cl.
*G03B 35/02* (2021.01)
*G06T 7/521* (2017.01)

(58) Field of Classification Search
USPC .............................................................. 348/46
See application file for complete search history.

(56) References Cited

U.S. PATENT DOCUMENTS

| | | |
|---|---|---|
| 9,256,943 B2 | 2/2016 | Appia et al. |
| 2010/0141780 A1 | 6/2010 | Tan |
| 2011/0249201 A1 | 10/2011 | Turner et al. |
| 2012/0262553 A1 | 10/2012 | Chen et al. |
| 2013/0278787 A1 | 10/2013 | Shpunt |
| 2014/0307057 A1 | 10/2014 | Kang et al. |
| 2014/0354803 A1 | 12/2014 | Chida |
| 2015/0085155 A1* | 3/2015 | Diaz Spindola ....... G06V 20/20 348/222.1 |
| 2015/0302627 A1* | 10/2015 | Cotter ...................... G06T 7/20 345/473 |

OTHER PUBLICATIONS

PCT/US2015/019357 International Search Report and Written Opinion dated Jul. 6, 2015.

* cited by examiner

METHOD AND SYSTEM FOR UNSYNCHRONIZED STRUCTURED LIGHTING

CROSS REFERENCE TO RELATED APPLICATIONS

This application is a continuation application of U.S. patent application Ser. No. 16/434,846 filed Jun. 7, 2019, which is a divisional application of U.S. patent application Ser. No. 15/124,176 filed Sep. 7, 2016, which is a national phase filing under 35 U.S.C. § 371 of International Application No. PCT/US2015/019357 filed Mar. 9, 2015, which claims priority to earlier filed U.S. Provisional Application Ser. No. 61/949,529 filed Mar. 7, 2014, the entire contents of which are incorporated herein by reference.

STATEMENT REGARDING GOVERNMENT INTEREST

This Invention was made with government support under grant number DE-FG02-08ER15937 awarded by the Department of Energy. The government has certain rights in the invention.

BACKGROUND OF THE INVENTION

1. Field of the Invention

This patent document relates generally to the field of three-dimensional shape capture of the surface geometry of an object, and more particularly to structured lighting three-dimensional shape capture.

2. Background of the Related Art

Three-dimensional scanning and digitization of the surface geometry of objects is commonly used in many industries and services, and their applications are numerous. A few examples of such applications are inspection and measurement of shape conformity in industrial production systems, digitization of clay models for industrial design and styling applications, reverse engineering of existing parts with complex geometry for three-dimensional printing, interactive visualization of objects in multimedia applications, three-dimensional documentation of artwork, historic and archaeological artifacts, human body scanning for better orthotics adaptation, biometry or custom-fit clothing, and three-dimensional forensic reconstruction of crime scenes.

One technology for three-dimensional shape capture is based on structured lighting. Three dimensional shape capture systems based on structure lighting are more accurate than those based on time-of-flight (TOF) image sensors. In a standard structured lighting 3D shape capture system a pattern projector is used to illuminate the scene of interest with a sequence of known two-dimensional patterns, and a camera is used to capture a sequence of images, synchronized with the projected patterns. The camera captures one image for each projected pattern. Each sequence of images captured by the camera is decoded by a computer processor into a dense set of projector-camera pixel correspondences, and subsequently into a three-dimensional range image, using the principles of optical triangulation.

The main limitation of three-dimensional shape capture systems is the required synchronization between projector and camera. To capture a three-dimensional snapshot of a moving scene, the sequence of patterns must be projected at a fast rate, the camera must capture image frames exactly at the same frame rate, and the camera has to start capturing the first frame of the sequence exactly when the projector starts to project the first pattern.

Therefore, there is a need for three-dimensional shape measurement methods and systems based on structure lighting where the camera and the pattern projector are not synchronized.

Further complicating matters, image sensors generally use one of two different technologies to capture an image, referred to as "rolling shutter" and "global shutter". "Rolling shutter" is a method of image capture in which a still picture or each frame of a video is captured not by taking a snapshot of the entire scene at single instant in time but rather by scanning across the scene rapidly, either vertically or horizontally. In other words, not all parts of the image of the scene are recorded at exactly the same instant. This is in contrast with "global shutter" in which the entire frame is captured at the same instant. Even though most image sensors in consumer devices are rolling shutter sensors, many image sensors used in industrial applications are global shutter sensors.

Therefore, there is a need for three-dimensional shape measurement methods and systems based on structure lighting where the camera and the pattern projector are not synchronized, supporting both global shutter and rolling shutter image sensors.

SUMMARY OF THE INVENTION

A system and method to capture the surface geometry a three-dimensional object in a scene using unsynchronized structured lighting solves the problems of the prior art. The method and system includes a pattern projector configured and arranged to project a sequence of image patterns onto the scene at a pattern frame rate, a camera configured and arranged to capture a sequence of unsynchronized image patterns of the scene at an image capture rate; and a processor configured and arranged to synthesize a sequence of synchronized image frames from the unsynchronized image patterns of the scene, each of the synchronized image frames corresponding to one image pattern of the sequence of image patterns. Because the method enables use of an unsynchronized pattern projector and camera significant cost savings can be achieved. The method enables use of inexpensive cameras, such as smartphone cameras, webcams, point-and-shoot digital cameras, camcorders as well as industrial cameras. Furthermore, the method and system enable processing the images with a variety of computing hardware, such as computers, digital signal processors, smartphone processors and the like. Consequently, three-dimensional image capture using structured lighting may be used with relatively little capital investment.

BRIEF DESCRIPTION OF THE DRAWINGS

These and other features, aspects, and advantages of the method and system will become better understood with reference to the following description, appended claims, and accompanying drawings where:

DETAILED DESCRIPTION

Figure 1:
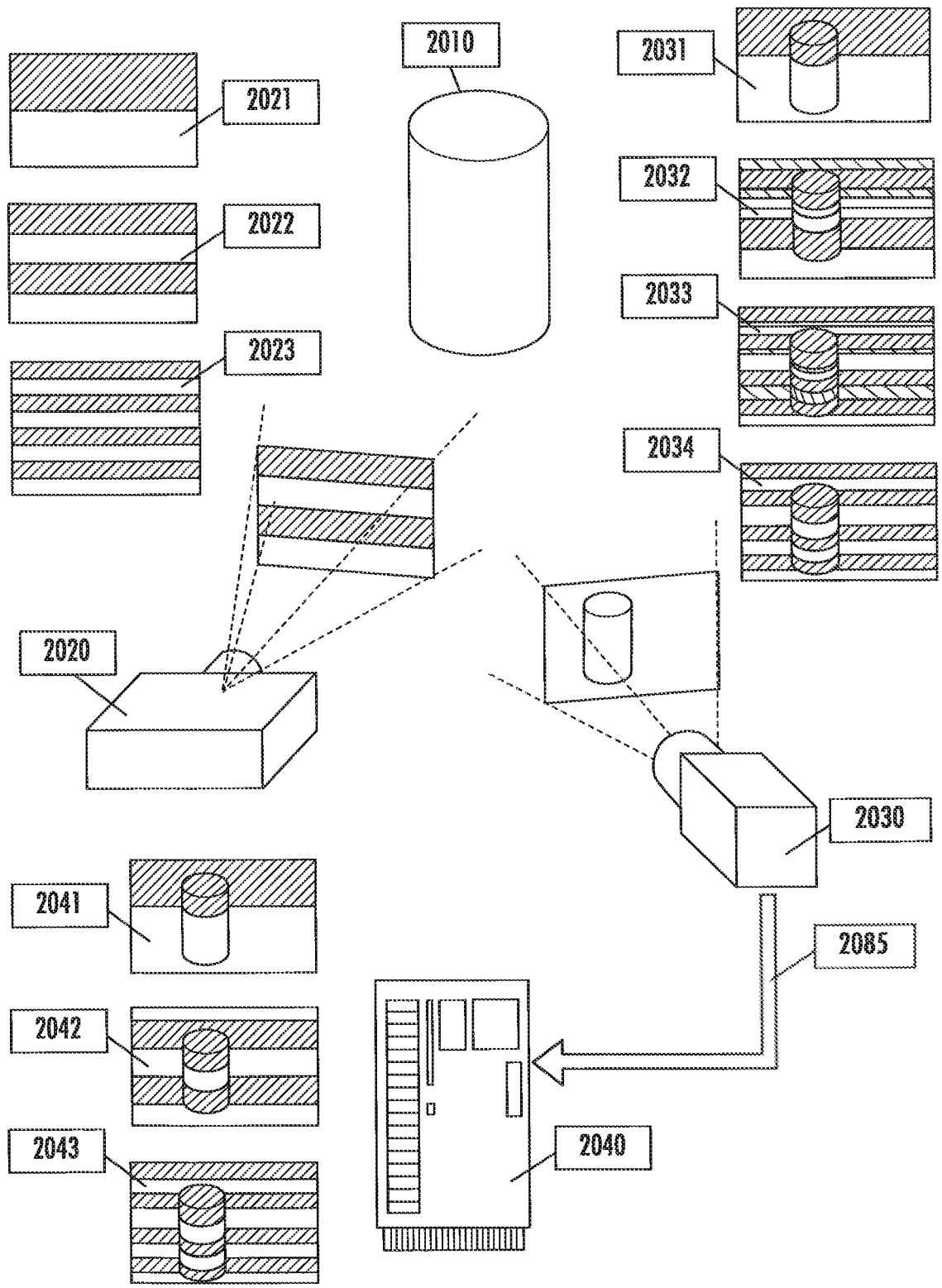
FIG. 1 is an illustration of an exemplary embodiment of the method and system for unsynchronized structured lighting.
Figure 2:
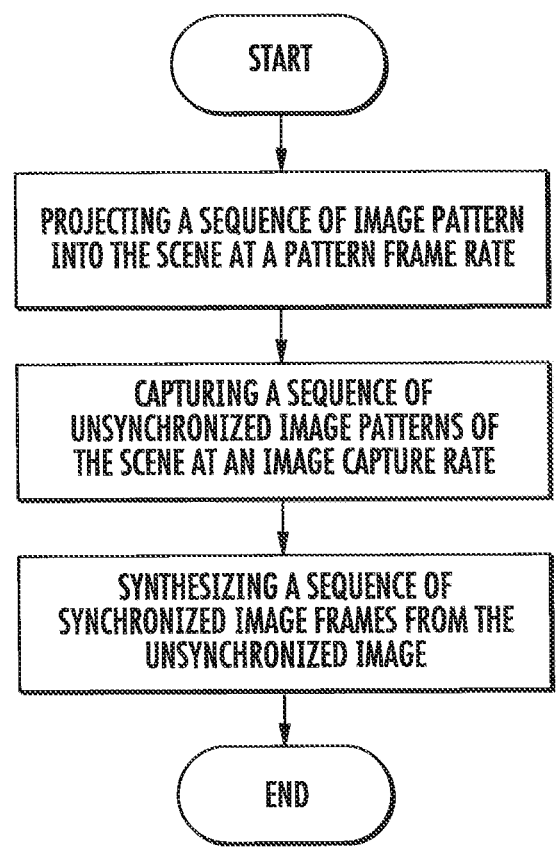
FIG. 2 shows a flowchart of an exemplary embodiment of the method and system for unsynchronized structured lighting.

A system and method to capture the surface geometry a three-dimensional object in a scene using unsynchronized structured lighting is shown generally in FIGS. 1 and 2. The method and system includes a pattern projector configured and arranged to project a sequence of image patterns onto the scene at a pattern frame rate, a camera configured and arranged to capture a sequence of unsynchronized image patterns of the scene at an image capture rate; and a processor configured and arranged to synthesize a sequence of synchronized image frames from the unsynchronized image patterns of the scene, each of the synchronized image frames corresponding to one image pattern of the sequence of image patterns.

One object of the present invention is a system to synthesize a synchronized sequence of image frames from an unsynchronized sequence of image frames, illustrated in FIG. 1; the unsynchronized image frames captured while a three-dimensional scene was illuminated by a sequence of patterns. The system comprises a pattern projector 2020 and a camera 2030. An object 2010 is partially illuminated by the pattern projector 2020, and partially visible by the camera 2030. The pattern projector projects a sequence of patterns 2021, 2022, 2023 at a certain pattern rate. The pattern rate is measured in patterns per second. The camera 2030 captures a sequence of unsynchronized image frames 2031, 2032, 2033, 2034, at a certain frame rate. The frame rate is larger or equal than the pattern rate. The number of unsynchronized image frames captured by the camera is larger or equal than the number of patterns in the sequence of patterns. The camera starts capturing the first unsynchronized image frame not earlier than the time when the projector starts projecting the first pattern of the sequence of image patterns. The camera ends capturing the last unsynchronized image frame not earlier than the time when the projector ends projecting the last pattern of the sequence of image patterns. To capture a frame the camera opens the camera aperture, which it closes after an exposure time. The camera determines the pixel values by integrating the incoming light while the aperture is open. Since camera and projector are not synchronized, the projector may switch patterns while the camera has the aperture open. As a result, some or all of the pixels of the captured unsynchronized image frame 2032 will be partially exposed to two consecutive patterns 2021 and 2022. The resulting sequence of unsynchronized image frames, are transmitted to a computer processor 2040, which executes a method to synthesize a synchronized sequence of image frames from the unsynchronized sequence of image frames. The number of frames in the synchronized sequence of image frames 2041, 2042, 2043 will be the same as the number of patterns 2021, 2022, 2023 and represent estimates of what the camera would have captured if it were synchronized with the projector. In a preferred embodiment the camera 2030 and the computer processor 2040 are components of a single device such a digital camera, smartphone, or computer tablet.

Another object of the invention is an unsynchronized three-dimensional shape capture system, comprising the system to synthesize a synchronized sequence of image frames from an unsynchronized sequence of image frames described above, and further comprising prior art methods for decoding, three-dimensional triangulation, and optionally geometric processing, executed by the computer processor.

Another object of the invention is a three-dimensional snapshot camera comprising the unsynchronized three-dimensional shape capture system, where the projector has the means to select the pattern rate from a plurality of supported pattern rates, the camera has the means to select the frame rate from a plurality of supported frame rates, and the camera is capable of capturing the unsynchronized image frames in burst mode at a fast frame rate. In a preferred embodiment the projector has a knob to select the pattern rate. In another preferred embodiment the pattern rate is set by a pattern rate code sent to the projector through a communications link. Furthermore, the system has means to set the pattern rate and the frame rate so that the frame rate is not slower than the pattern rate. In a more preferred embodiment the user sets the pattern rate and the frame rate.

In a more preferred embodiment of the snapshot camera, the camera has the means to receive a camera trigger signal, and the means to set the number of burst mode frames. In an even more preferred embodiment, the camera trigger signal is generated by a camera trigger push-button. When the camera receives the trigger signal it starts capturing the unsynchronized image frames at the set frame rate, and it stops capturing unsynchronized image frames after capturing the set number of burst mode frames.

In a first preferred embodiment of the snapshot camera with camera trigger signal, the projector continuously projects the sequence of patterns in a cyclic fashion. In a more preferred embodiment the system has the means of detecting when the first pattern is about to be projected, and the camera trigger signal is delayed until that moment.

In a second preferred embodiment of the snapshot camera with camera trigger signal, the projector has the means to receive a projector trigger signal. In a more preferred embodiment the camera generates the projector trigger signal after receiving the camera trigger signal, and the camera has the means to send the projector trigger signal to the projector. In an even more preferred embodiment the camera has a flash trigger output, and it sends the projector trigger signal to the projector through the flash trigger output. When the projector receives the trigger signal it starts projecting the sequence of patterns at the set pattern rate, and it stops projecting patterns after it projects the last pattern.

Another object of this invention is a method to synthesize a synchronized sequence of image frames from an unsynchronized sequence of image frames, generating a number of frames in the synchronized sequence of image frames equal to the number of projected patterns, and representing estimates of what the camera would have captured if it were synchronized with the projector.

Figure 3:
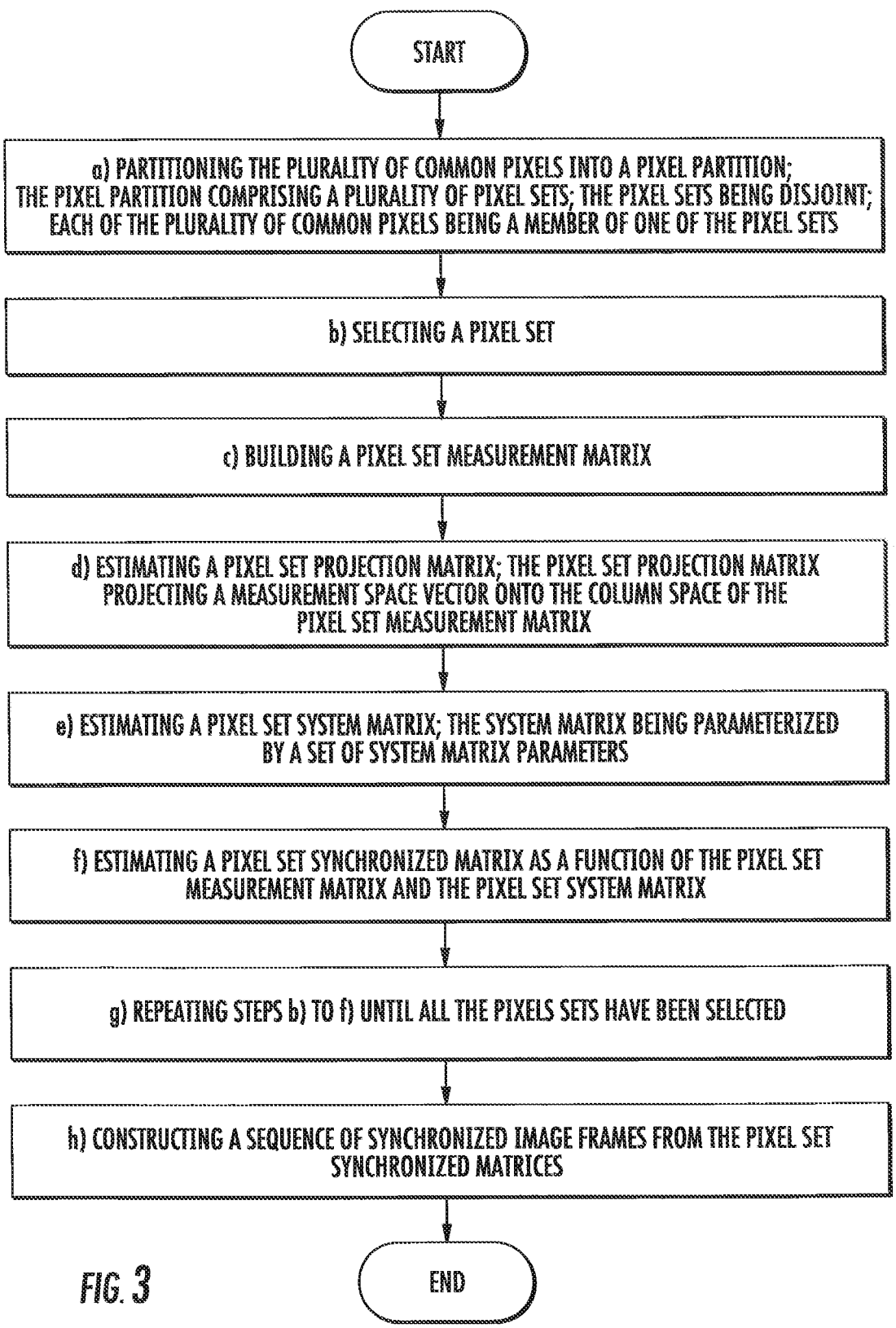
FIG. 3 shows a flowchart of an exemplary embodiment of the method and system for unsynchronized structured lighting of synthesizing the synchronized sequence of image frames.

As will be described in greater detail below in the associated proofs, the method to synthesize the synchronized sequence of image frames from the unsynchronized sequence of image frames is shown generally in FIG. 3. Each of the synchronized image frames corresponds to one of a sequence of image patterns. Further, the synchronized image frames and unsynchronized image frames have the same width and height. Each image frame includes a plurality of common pixels. In a first step a) the plurality of common pixels is partitioned into a pixel partition. The pixel partition includes a plurality of pixel sets, each of which is disjoint. Further each of the plurality of common pixels is a member of one of the pixel sets. In a step b) a pixel set is selected. In a step c) a pixel set measurement matrix is built. In a step d) a pixel set projection matrix is estimated. The pixel set projection matrix projects a measurement space vector onto the column space of the pixel set measurement matrix. In a step e) a pixel set system matrix is estimated. The system matrix is parameterized by a set of system matrix parameters. In a step f) a pixel set synchronized matrix as a function of the pixel set measurement matrix and the pixel set system matrix is estimated. In a step g) steps b) to f) are repeated until all the pixels sets have been selected. In a step h) a sequence of synchronized image frames from the pixel set synchronized matrices is constructed.

Figure 4:
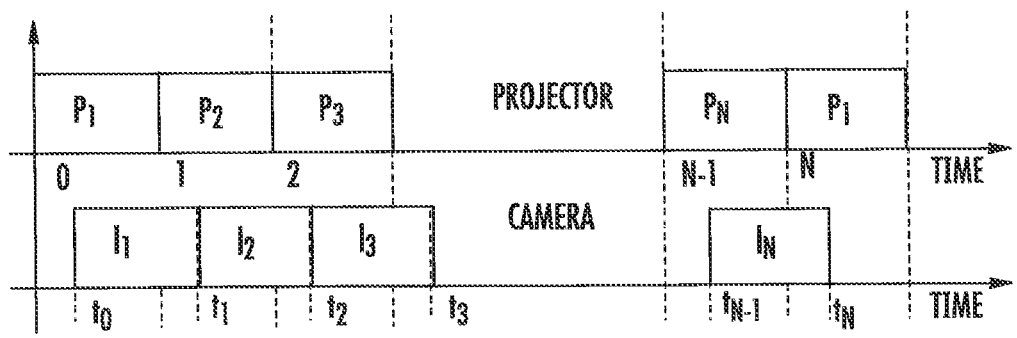
FIG. 4 is a chart illustrating the timing for a method to synthesize the synchronized sequence of image frames from an unsynchronized sequence of image frames, where a global shutter image sensor is used and where the image frame rate is identical to the pattern frame rate.

In a preferred embodiment, the method to synthesize the synchronized sequence of image frames from an unsynchronized sequence of image frames, applies to a global shutter image sensor where the image frame rate is identical to the pattern frame rate. FIG. 4 illustrates the timing for this embodiment. In this embodiment, the projector projects N patterns at a fixed frame rate, a global shutter image sensor capture N images at identical frame rate. Capturing each image takes exactly one unit of time, normalized by the projector frame rate. The start time for the first image capture t.sub.0 is unknown, but the start time for the n-th image capture is related to the start time for the first image capture $t_n = t_0 + n - 1$. The actual value measured by the image sensor at the (x, y) pixel of the n-th image, can be modeled as $$I_n(x,y) = (1-t_0)P_n(x,y) + t_0 P_{n+1}(x,y)$$

where $P_n(x, y)$ and $P_{n-1}(x, y)$ represent the pattern values to be estimated that contribute to the image pixel (x, y) and $P_{n+1} = P_1$. Projected patterns are known in advance, but since it is not known which projector pixel illuminates each image pixel, they have to be treated as unknown. To estimate the value of t.sub.0, the following expression is minimized $$E(t_0) = \frac{1}{2} \sum_{n=1}^{N} \sum_{(x,y)} ((1 - t_0)P_n(x, y) + t_0 P_{n+1}(x, y) - I_n(x, y))^2$$

with respect to $t_0$, where the sum is over a subset of pixels (x, y) for which the corresponding pattern pixel values $P_n(x, y)$ and $P_{n-1}(x, y)$ are known. Differentiating $E(t_0)$ with respect to $t_0$ and equating the result to zero, an expression to estimate $t_0$ is obtained $$t_0 = \frac{\sum_{n=1}^{N} \sum_{(x,y)} (P_{n+1}(x, y) - P_n(x, y))(I_n(x, y) - P_n(x, y))}{\sum_{n=1}^{N} \sum_{(x,y)} (P_{n+1}(x, y) - P_n(x, y))^2}$$

Once the value of $t_0$ has been estimated, the N pattern pixel values $P_1(x, y), \ldots, P_n(x, y)$ can be estimated for each pixel (x, y) by minimizing the following expression $$E(P_1(x,y), \ldots, P_N(x,y)) = \frac{1}{2} \Sigma_{n=1}^{N} ((1-t_0) P_n(x,y) + t_0 P_{n+1}(x,y) - I_n(x,y))^2$$

which reduces to solving the following system of N linear equations $$\beta P_{n-1}(x,y) + \alpha P_n(x,y) + \beta P_{n+1}(x,y) = t_0 I_{n-1}(x,y) + (1-t_0) I_n(x,y)$$

for n=1, ..., N, where $\alpha = t_0^2 + (1-t_0)^2$ and $\beta = t_0(1-t_0)$.

Figure 5:
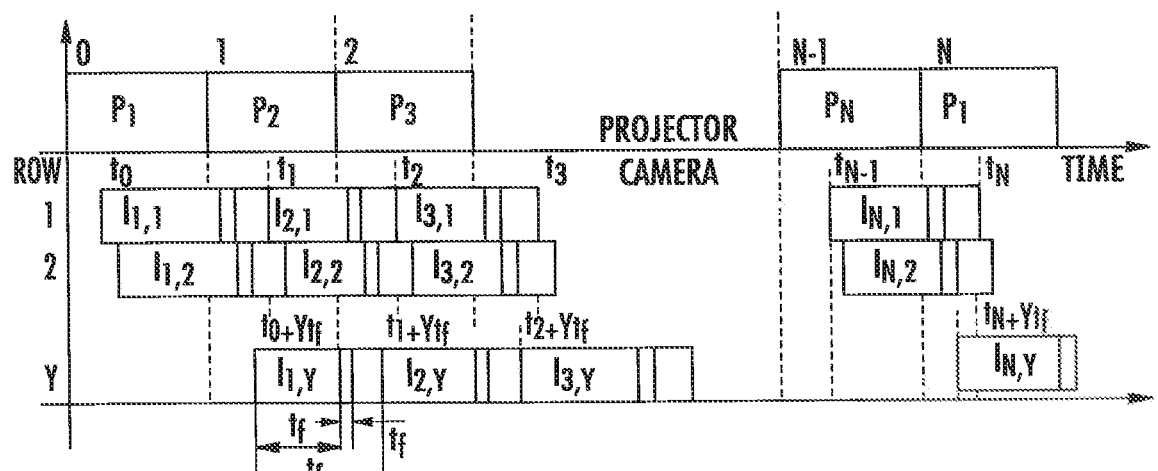
FIG. 5 is a chart illustrating the timing for a method to synthesize the synchronized sequence of image frames from an unsynchronized sequence of image frames, where a rolling shutter image sensor is used and where the image frame rate is identical to the pattern frame rate.

In another preferred embodiment, the method to synthesize the synchronized sequence of image frames from an unsynchronized sequence of image frames, applies to a rolling shutter image sensor where the image frame rate is identical to the pattern frame rate. FIG. 5 illustrates the timing for this embodiment. We project N patterns at fixed framerate, a rolling shutter camera captures N images. Capture begins while pattern $P_1$ is being projected. Projector framerate is 1, pattern $P_n$ is projected between time n−1 and n. A camera frame is read every $t_f$ time, camera framerate is assumed equal to projector framerate but in practice may vary a little. A camera row requires $t_r$ time to be readout from the sensor, thus, a sensor with Y rows needs a time $Yt_r$ to read a complete frame, $Yt_f$ less than or equal to $t_r$. Each camera frame is exposed t.sub.e time, its readout begins immediately after exposure ends, $t_e + t_f$ less than or equal to $t_f$.

Camera row y in image n begins being exposed at time $t_{n,y}$ $$t_{n,y} = t_0 + (n-1)t_f + y t_r, y : 0 \ldots Y-1,$$

and exposition ends at time $t_{n,y} + t_e$

In this model image n is exposed while pattern $P_n$ and $P_{n+1}$ are being projected. Intensity level measured at a pixel in row y is given by $$I_{n,y} = (n - t_{n,y}) k_{n,y} P_n + (t_{n,y} + t_e - n) k_{n,y} P_{n+1} + C_{n,y},$$

The constants $k_{n,y}$ and $C_{n,y}$ are scene dependent.

Let be min $\{I_{n,y}\}$ a pixel being exposed while P(t)=0, and max $\{I_{n,y}\}$ a pixel being exposed while P(t)=1, max $\{I_{n,y}\} = t_e k_{n,y} + C_{n,y}$. Now, we define a normalized image $\tilde{I}_{n,y}$ as, $$\tilde{I}_{n,y} = \frac{(n - t_{n,y})P_n + (t_{n,y} t_e - n)P_{n+1}}{t_e}$$

A normalized image is completely defined by the time variables and pattern values. In this section we want to estimate the time variables. Lets rewrite Equation 58 as $$\tilde{I}_{n,y} = -n \Delta P_n \frac{1}{t_e} + (n-1) \Delta P_n \frac{t_f}{t_e} + y \Delta P_n \frac{t_r}{t_e} + \Delta P_n \frac{t_0}{t_e} + P_{n+1}$$

being $t_0$ and d unknown. Image pixel values are given by $$I_n(x,y)=(1-t_0-yd)P_n(x,y)+(t_0+yd)P_n+1(x,y),$$

Same as before, $P_n(x, y)$ and $P_{n+1}(x, y)$ represent the pattern values contributing to camera pixel (x, y), we define $P_{n+1}=P_1$, $P_0=P_n$, $I_{n+1}=I_1$, and $I_0=I_N$, and I will omit pixel (x, y) to simplify the notation. We now minimize the following energy to find the time variables $t_0$ and d $$E(t_0, d) = \frac{1}{2}\sum_{n=1}^{N}\sum_{x,y}((1-t_0-yd)P_n + (t_0+yd)P_{n+1} - I_n)^2$$

The partial derivatives are given by $$\frac{\partial E(t_0, d)}{\partial t_0} = \sum_{n=1}^{N}\sum_{x,y}(P_{n+1}-P_n)((1-t_0-yd)P_n + (t_0+yd)P_{n+1} - I_n)$$

$$\frac{\partial E(t_0, d)}{\partial d} = \sum_{n=1}^{N}\sum_{x,y}y(P_{n+1}-P_n)((1-t_0-yd)P_n + (t_0+yd)P_{n+1} - I_n)$$

We set the gradient equal to the null vector and reorder as $$\begin{bmatrix}t_0\\d\end{bmatrix} = \left(\sum_{n,x,y}(P_{n+1}-P_n)^2\begin{bmatrix}1 & y\\y & y^2\end{bmatrix}\right)^{-1}\left(\sum_{n,x,y}(P_{n+1}-P_n)(I_n-Pn)\begin{bmatrix}1\\y\end{bmatrix}\right)$$

We use Equation 29 to compute $t_0$ and d when we have some known (or estimated) pattern values.

With known $t_0$ and d we estimate pattern values minimizing $$E(P_1, \ldots, P_N) = \frac{1}{2}\sum_{n=1}^{N}((1-t_0-yd)P_n + (t_0+yd)P_{n+1} - I_n)^2.$$

Analogous as in Case 1 we obtain that Ap=b with A as in Equation 12 and α, β, and b defined as $$\alpha=(1t_0-yd)^2+(t_0+yd)^2, \beta=(1-t_0-yd)(t_0+yd)$$

$$b=(1-t_0-yd)(I_1I_2\ldots,I_N)^T+(t_0+yd)(I_N,I_1,\ldots I_{N-1})^T$$

Pattern values for each pixel are given by $p=A^{-1}b$.

Figure 6:
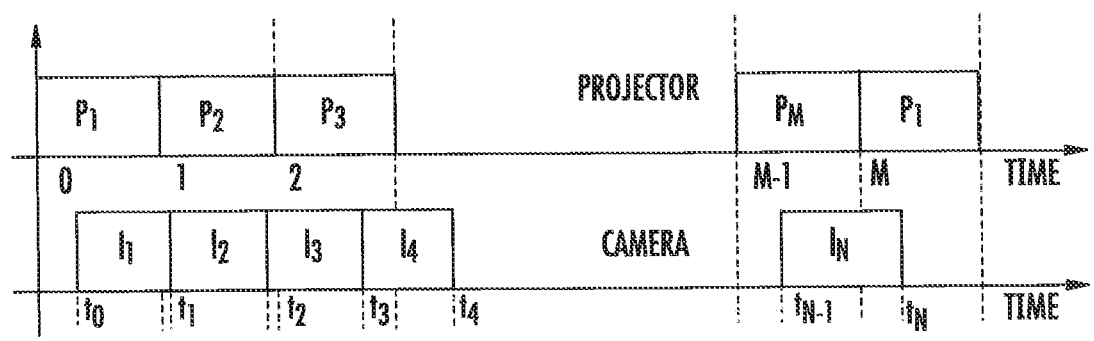
FIG. 6 is a chart illustrating the timing for a method to synthesize the synchronized sequence of image frames from an unsynchronized sequence of image frames, where a global shutter image sensor is used and where the image frame rate is higher or equal than the pattern frame rate

In another preferred embodiment, the method to synthesize the synchronized sequence of image frames from an unsynchronized sequence of image frames, applies to a global shutter image sensor where the image frame rate is higher or equal than the pattern frame rate. FIG. 6 illustrates the timing for this embodiment. We now project M patterns at fixed framerate and we capture N images with a global shutter camera, also at a fixed framerate. We require that N≥M. Capture begins while pattern $P_1$ is being projected. We introduce a new variable d which is the camera capture delay from one row to the next. Same as in Case 1, up to two patterns may contribute to each image but here we do not know which ones are because the camera frame rate is unknown. The new image equation is $$I_n = \int_{t_{n-1}}^{t_n}\sum_{m=1}^{M}f_m(t)P_m dt = \sum_{m=1}^{M}P_m\int_{t_{n-1}}^{t_n}f_m(t)dt$$

-continued $$f_m(t) = \begin{cases}1 & \text{if } m-1 \leq t \leq m\\0 & \text{otherwise}\end{cases}$$

Let $\Delta t = t_{n-1} - t_n$ the time between image frames, let $p=(P_1, \ldots, P_M)^T$ and $\Phi_n(t_0, \Delta t)=(\Phi_n, 1, t_0, \Delta t), \ldots, \Phi(n, M, t_0, \Delta t))^T$ and rewrite Equation 33 as $$I_n = \frac{1}{\Delta t}\phi_n(t_0, \Delta t)^T p$$

Each function $\Phi(n, m, t_0, \Delta t)=\int_{n-1}^{m}f_m(t)dt$ can be written as $$\Phi(n,m,t0,\Delta t)=\max(0,\min(m,t_n)-\max(m-1,t_{n-1}))$$

Same as before, $P_n(x, y)$ represents a pattern value contributing to camera pixel (x, y), we define $P_{n+1}=P_1$, $P_0=P_N$, $I_{n+1}=I_1$, and $I_0=I_n$, and I will omit pixel (x, y) to simplify the notation.

We now minimize the following energy to find the time variables $t_0$ and $\Delta t$ $$E(t_0, \Delta t) = \frac{1}{2}\sum_{n=1}^{N}\sum_{x,y}\left(\frac{1}{\Delta t}\phi_n(t_0, \Delta t)^T p - I_n\right)^2$$

We solve for $t_0$ and $\Delta t$ by making $$\nabla E(t_0, \Delta t) = 0$$

$$\nabla E(t_0, \Delta t) = \sum_{n=1}^{N}\sum_{x,y}\frac{1}{\Delta t}J\phi_n(t_0, \Delta t)^T p\left(\frac{1}{\Delta t}\phi_n(t_0, \Delta t)^T p - I_n\right)$$

Because $J\Phi_n(t_0, \Delta t)$ depends on the unknown value $t=(t_0, \Delta t)^T$ we solve for them iteratively $$t^{(i-1)} = A_t(t^{(i)})^{-1}b_t(t^{(i)})$$

$$A_t(t) = \sum_{n=1}^{N}\sum_{x,y}\frac{1}{\Delta t^2}J\phi_n(t)^T pp^T V_A(n, t)$$

$$b_t(t) = \sum_{n=1}^{N}\sum_{x,y}\frac{1}{\Delta t}J\phi_n(t)^T p\left(I_n - \frac{1}{\Delta t}V_b(n, t)^T p\right)$$

Matrix $V_A(n,t)$ and vector $V_b(n,t)$ are defined such as $$\phi_n(t) = V_A(n, t)\begin{bmatrix}t_0\\\Delta t\end{bmatrix} + V_b(n, t)$$

For completeness we include the following definitions:

$$V_A(n, t) = [v_A(n, 1, t), \ldots, v_A(n, M, t)]^T$$

$$V_b(n, t) = [v_b(n, 1, t), \ldots, v_b(n, M, t)]^T$$

$$t_{diff} \equiv \min(m, t_n) - \max(m-1, t_{n-1})$$

-continued $$v_A(n, m, t) = \begin{cases} [0, 1]^T & \text{if } m-1 \le t_{n-1} \le t_n \le m \text{ and } t_{diff} > 0 \\ [-1, 1-n]^T & \text{if } m-1 \le t_{n-1} \le m \le t_n \text{ and } t_{diff} > 0 \\ [1, n]^T & \text{if } t_{n-1} \le m-1 \le t_n \le m \text{ and } t_{diff} > 0 \\ [0, 0]^T & \text{if } t_{n-1} \le m-1 \le m \le t_n \text{ and } t_{diff} > 0 \\ [0, 0]^T & \text{otherwise} \end{cases}$$

$$v_b(n, m, t) = \begin{cases} 0 & \text{if } m-1 \le t_{n-1} \le t_n \le m \text{ and } t_{diff} > 0 \\ m & \text{if } m-1 \le t_{n-1} \le m \le t_n \text{ and } t_{diff} > 0 \\ 1-m & \text{if } t_{n-1} \le m-1 \le t_n \le m \text{ and } t_{diff} > 0 \\ 1 & \text{if } t_{n-1} \le m-1 \le m \le t_n \text{ and } t_{diff} > 0 \\ 0 & \text{otherwise} \end{cases}$$

$$J\phi_n(t) = V_A(n, t)$$

With known $t_0$ and $\delta t$ we estimate pattern values minimizing $$E(p) = \frac{1}{2} \sum_{n=1}^{N} (\phi_n(t)^T p - I_n)^2$$

Analogous as in Case 1 we obtain that $Ap=b$ with $$A = \Phi^T \Phi,$$
$$b = \Phi^T I$$
$$\Phi = \begin{bmatrix} \phi_1(t)^T \\ \vdots \\ \phi_N(t)^T \end{bmatrix}$$

Pattern values for each pixel are given by $p = A^{-1}b$.

Figure 7:
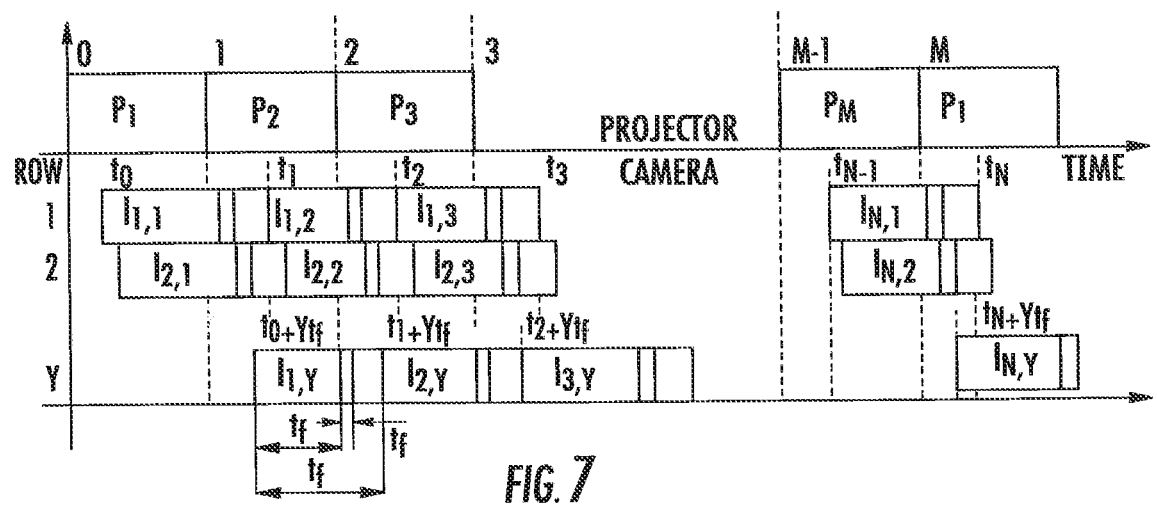
FIG. 7 is a chart illustrating the timing for method to synthesize the synchronized sequence of image frames from an unsynchronized sequence of image frames, where a rolling shutter image sensor is used and where the image frame rate is higher or equal than the pattern frame rate.

In another preferred embodiment, the method to synthesize the synchronized sequence of image frames from an unsynchronized sequence of image frames, applies to a rolling shutter image sensor where the image frame rate is higher or equal than the pattern frame rate. FIG. 7 illustrates the timing for this embodiment. Projector frame rate is 1, pattern $P_m$ is projected between time $m-1$ and $m$. A camera frame is read every $t_f$. A camera row requires $t_r$ time to be readout from the sensor, thus, a sensor with Y rows needs a time $Yt_r$ to read a complete frame, $t_f \ge Yt_r$. Each camera frame is exposed $t_{.sub.e}$ time, its readout begins immediately after exposure ends, $t_e + t_r \ge t_f$.

Camera row $y$ in image $n$ begins being exposed at time $t_{n, y}$ $$t_{n,y} = t_0 + (n-1)t_f + yt_y, y:0 \ldots Y-1$$

and exposition ends at time $t_{n,y} + t_e$.

In this model a pixel intensity in image n at row y is given by $$I_{n,y} = \int_{t_{n,y}}^{t_{n,y}+t_e} k_{n,y} P(t)dt + C_{n,y}$$

$$I_{n,y} = \sum_{m=1}^{M} \max\left(0, \int_{\max(t_{n,y},m-1)}^{\min(t_{n,y}+t_e,m)} k_{n,y} P_m dt\right) + C_{n,y}$$

The constants $k_{n,y}$ and $C_{n,y}$ are scene dependent, $P_{.sub.m}$ is either 0 or 1.

Let be $\min\{I._{sub.n, y}\}$ a pixel being exposed while $P(t)=0$, and $\max\{I._{sub.n, y}\}$ a pixel being exposed while $P(t)=1$, $$\min\{I_{n,y}\} = C_{n,y}$$

$$\max\{I_{n,y}\} = t_e k_{n,y} + C_{n,y}$$

Now, we define a normalized image$._{sub.n, yas}$, $$\tilde{I}_{n,y} = \frac{I_{n,y} - \min\{I_{n,y}\}}{\max\{I_{n,y}\} \min\{I_{n,y}\}}$$

$$\tilde{I}_{n,y} = \frac{1}{t_e} \sum_{m=1}^{M} \max\left(0, \int_{\max(t_{n,y},m-1)}^{\min(t_{n,y}+t_e,m)} P_m dt\right)$$

A normalized image is completely defined by the time variables and pattern values. In this section we want to estimate the time variables. Lets rewrite the previous equation as, $$\tilde{I}_{n,y} = \sum_{m=1}^{M} \phi(n, m, y) P_m$$

$$\phi(n, m, y) = \frac{1}{t_e} \max(0, \min(t_{n,y} + t_e, m) - \max(t_{n,y}, m-1))$$

Let be $$h = \frac{1}{t_e}(1, t_f, t_r, t_0)^T,$$

now we write $\phi(n, m, y) = v_{nmy}^T h$ with $v_{nmy}$ defined as $$v_{nmy}^T = \begin{cases} [t_e, 0, 0, 0] & \text{if } t_{n2} < t_{m2} \wedge t_{n1} > t_{m1} \wedge t_{n2} > t_{n1} \\ [t_e - m + 1, n-1, y, 1] & \text{if } t_{n2} < t_{m2} \wedge t_{n1} \le t_{m1} \wedge t_{n2} > t_{n1} \\ [m, 1-n, -y, -1] & \text{if } t_{n2} \ge t_{m2} \wedge t_{n1} > t_{m1} \wedge t_{m2} > t_{n1} \\ [1, 0, 0, 0] & \text{if } t_{n2} \ge t_{m2} \wedge t_{n1} \le t_{m1} \wedge t_{m2} > t_{m1} \\ [0, 0, 0, 0] & \text{otherwise} \end{cases}$$

$$t_{n1} = t_{n,y}, \; t_{n2} = t_{n,y} + t_e, \; t_{m1} = m-1, \; t_{m2} = m$$

Let be $p = (P_1, \ldots, P_M)^T$ and let $V_{ny}$ be $$V_{ny} = \begin{bmatrix} - & v_{n1y}^T & - \\ & \vdots & \\ - & v_{nMy}^T & - \end{bmatrix}.$$

We now minimize the following energy to find the unknown $h$ $$E(h) = \frac{1}{2} \sum_{n=1}^{N} \sum_{x,y} (p(x, y)^T V_{ny} h - \tilde{I}_n(x, y))^2$$

with the following constraints $$h > \begin{bmatrix} 0 \\ 1 \\ 0 \\ 0 \end{bmatrix} \text{ and } \begin{bmatrix} 0 & -1 & \gamma & 0 \\ 0 & -1 & 1 & 0 \end{bmatrix} h \le \begin{bmatrix} 0 \\ -1 \end{bmatrix}$$

or equivalently $$\frac{t_r}{e} - \frac{t_f}{t_e} \le -1 \Rightarrow t_r + t_e \le t_f$$

Equation E(h) cannot be minimized in closed form because the values matrix $V_{n,y}$ depends on the unknown values. Using an iterative approach the current value $h^{(i)}$ is used to compute $V_{n,y}^{(i)}$ and the next value $h^{(i+1)p1}$.

Figure 8:
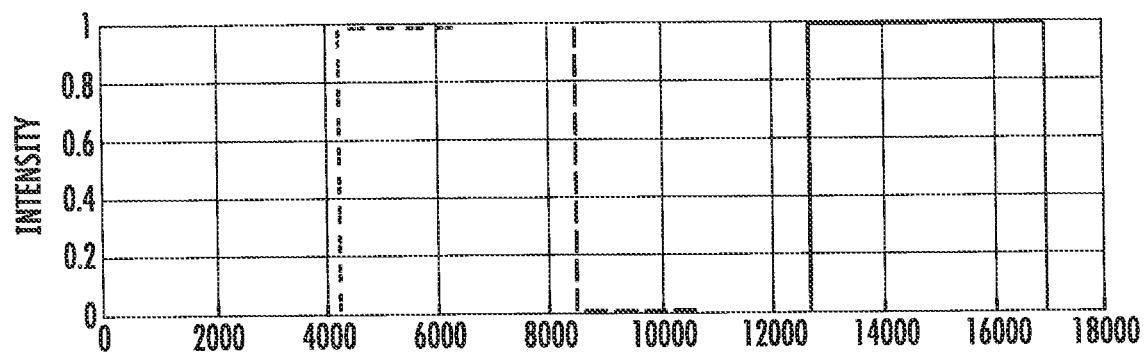
FIG. 8 shows a chart illustrating a calibration pattern used to correct the time.
Figure 9:
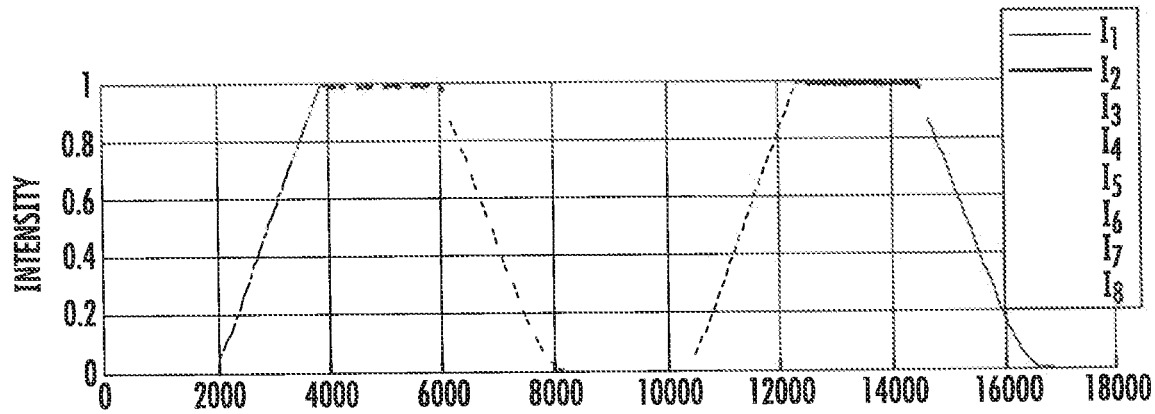
FIG. 9 shows a chart illustrating image data normalized according to the method described herein.

Up to this point we have assumed that the only unknown is h, meaning that pattern values are known for all image pixels. The difficulty lies is knowing which pattern pixel is being observed by each camera pixel. We simplify this issue by making calibration patterns all 'black or all 'white', best seen in FIG. 8. For example, a sequence of four patterns '{black, black, white, white}' will produce images with completely black and completely white pixels, as well as pixels in transition from black to white and vice versa. The all black or white pixels are required to produce normalized images, as shown in FIG. 9, and the pixels in transition constrain the solution of the parameter h in Equation E(h).

Figure 10:
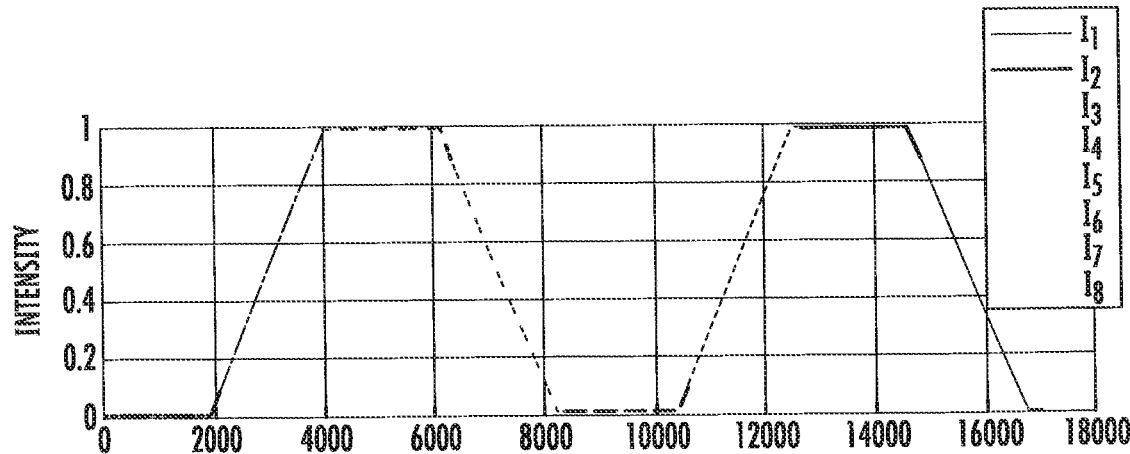
FIG. 10 shows a chart illustrating a model estimating the pattern value for each pixel in a captured image.

Decoding is done in two steps: 1) the time offset $t_0$ need to be estimated for this particular sequence; 2) the pattern values are estimated for each camera pixel, as shown in FIG. 10. Value $t_0$ is estimated using Equation E(h) where the known components of h are fixed, but some pattern values are required to be known, specially we need to know for some pixels whether they are transitioning from 'black' to 'white' or the opposite. Non-transitioning pixels provided no information in this step. Until now, we have projected a couple of black's and white's at the beginning of the sequence to ensure we can normalized all pixels correctly and to simplify $t_0$ estimation. We will revisit this point in the future for other pattern sequences.

Similarly as for the time variables, pattern values are estimated by minimizing the following energy $$E(p) = \frac{1}{2} \sum_{n=1}^{N} (h^T V_{ny}^T p(x,y) - \tilde{I}_n(x,y))^2, \text{ s.t. } |p_m| \le 1$$

The matrix $h^T V_{n,y}^T$ is bi-diagonal for N=M and it is fixed if h is known.

Therefore, it can be seen that the exemplary embodiments of the method and system provides a unique solution to the problem of using structure lighting for three-dimensional image capture where the camera and projector are unsynchronized.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed is:

1. The system to capture the surface geometry of a three dimensional object in a scene comprising a pattern projector, a camera, and a computing processor;
    the pattern projector configured and arranged to project a sequence of image patterns onto the scene at a pattern frame rate;
    the pattern frame rate measured in image patterns per second;
    the sequence of image patterns containing a number of image patterns; the number of image patterns being equal to the length of the sequence of image patterns;
    the camera having an image sensor;
    the camera configured and arranged to capture a sequence of unsynchronized image frames of the scene at an image capture rate;
    the image capture rate measured in frames per second;
    the image capture rate being larger or equal than the pattern frame rate;
    the sequence of unsynchronized image frame containing a number of unsynchronized image frames;
    the number of unsynchronized image frames being equal to the length of the sequence of unsynchronized image frames;
    the number of unsynchronized image frames captured by the camera being larger or equal than the number of image patterns;
    the sequence of image patterns having a first image pattern, a plurality of intermediate image patterns, and a last image pattern;
    the sequence of unsynchronized image frames having a first unsynchronized image frame, a plurality of intermediate unsynchronized image frames, and a last unsynchronized image frame;
    the projector starting projecting the first image pattern at a first start projection time;
    the projector ending projecting the first image pattern at a first stop projection time;
    the camera starting capturing the first unsynchronized image frame at a first start capture time;
    the first start capture time being not earlier than the first start projection time;
    the first start capture time being not later than at the first stop projection time;
    the projector starting projecting the last image pattern at a last start projection time;
    the projector ending projecting the last image pattern at a last stop projection time;
    the camera ending capturing the last unsynchronized image frame at a last stop capture time;
    the last stop capture time being larger or equal than last start projection time;
    the last stop capture time being less or equal than last stop projection time;
    the computing processor configured and arranged to execute a process to synthesize a sequence of synchronized image frames from the sequence of unsynchronized image frames;
    the unsynchronized image frames and the unsynchronized images frames being digital images of the same dimensions, and sharing a plurality of common image pixels;
    each unsynchronized image frame having an unsynchronized pixel value corresponding to each common image pixel;
    each synchronized image frame having a synchronized pixel value corresponding to each common image pixel;

the sequence of synchronized image frame containing a number of synchronized image frames;

the number of synchronized image frames being equal to the length of the sequence of synchronized image frames;

the number of synchronized image frames being equal to the number of image patterns; and each of the synchronized image frames corresponding to one image pattern in the sequence of image patterns.

2. The system, as in claim 1, where the camera and the computing processor are components of a single device such a digital camera, smartphone, or computer tablet.

3. The system as in claim 1, further comprising processes for decoding, three dimensional triangulation, and optionally geometric processing, executed by the computing processor.

4. The system as in claim 1, where the projector can select the pattern rate from a plurality of supported pattern rates, the camera can select the frame rate from a plurality of supported frame rates, and the camera can capture the unsynchronized image frames in burst mode at a fast frame rate.

5. The system as in claim 4, where the projector has a knob to select the pattern rate.

6. The system as in claim 4, where the pattern rate is set by a pattern rate code sent to the projector through a communications link.

7. The system as in claim 4, wherein the pattern rate and the frame rate are set so that the frame rate is not slower than the pattern rate.

8. The system as in claim 4, wherein a user sets the pattern rate and the frame rate.

9. The system as in claim 4, where the camera can receive a camera trigger signal, and set the number of burst mode frames.

10. The system as in claim 9, where the camera trigger signal is generated by a camera trigger push-button, and the camera starts capturing the unsynchronized image frames at the set frame rate as soon as it receives the trigger signal, and it stops capturing unsynchronized image frames after capturing the set number of burst mode frames.

11. The system as in claim 9, where the projector continuously projects the sequence of patterns in a cyclic fashion.

12. The system as in claim 11, wherein the process can detect when the first pattern is about to be projected, and the camera trigger signal is delayed until that moment.

13. The system as in claim 9, where the projector can receive a projector trigger signal.

14. The system as in claim 13, where the camera can send the projector trigger signal to the projector.

15. The system as in claim 14, where the camera has a flash trigger output, and it sends the projector trigger signal to the projector through the flash trigger output, the projector starts projecting the sequence of patterns at the set pattern rate when it receives the trigger signal, and the projector stops projecting patterns after it projects the last pattern.

16. The system as in claim 1, where the camera image sensor is a global shutter image sensor, the image capture rate is equal to the pattern frame rate, the number of image patterns in the sequence of image patterns is equal to the number of unsynchronized image frames in the sequence of unsynchronized image frames, a method to synthesize the sequence of synchronized image frames from the sequence of unsynchronized image frames comprises the following steps:

a determining a plurality of active pixels; the plurality of active pixels being a subset of the plurality of common pixels; each active pixel in the plurality of active pixels corresponding to a three dimensional point in the scene illuminated by the image patterns projected by projector;

b determining a plurality of active pixels with known synchronized values; the plurality of active pixels with known synchronized values being a subset of the plurality of active pixels;

c estimating a normalized start time for the first unsynchronized image frame as a function of the plurality of active pixels with known synchronized values, and the unsynchronized image frames; the normalized start time being the difference between the first start capture time and the first start projection time, divided by the image capture frame time; the image capture frame time being the inverse of the image capture rate;

d selecting an active pixel;

e estimating the synchronized pixel values of the synchronized image frames corresponding to the active pixel; and f repeating steps d) and e) until all active pixels have been selected.

17. The system as in claim 16, where the step of estimating the normalized start time for the first unsynchronized image frame is performed by minimizing the following expression with respect to the normalized start time $$\frac{1}{2}\sum_{n=1}^{N}\sum_{(x,y)}((1-t_0)P_n(x,y)+t_0 P_{n+1}(x,y)-I_n(x,y))^2$$

where $t_0$ is the normalized start time, N is the number of image patterns, n is a pattern index, (x, y) is one of the active pixels, the second sum is over the active pixels, $P_n(x, y)$ is the synchronized pixel value of the n-th. synchronized image frame corresponding to the active pixel (x, y, $Pn+_1(x, y)$ is the synchronized pixel value of the (n+1)-th. synchronized image frame corresponding to the active pixel (x, y, $P_N+_1(x, y)$ $P_1(x, y)$, and $I_n(x, y)$ is the pixel value of the n-th. unsynchronized image frame corresponding to the active pixel (x, y).

18. The system as in claim 16, where the step of estimating the synchronized pixel values of the synchronized image frames corresponding to the active pixel is performed by solving the following N×N system of linear equations with respect to the synchronized pixel values of the synchronized image frames corresponding to the active pixel $$\beta P_{n-1}(x,y)+\alpha P_n(x,y)+\beta P_{n+1}(x,y)=t_0 I_{n-1}(x,y)+(1-t_0)I_n(x,y)\ n=1,\ldots,N$$

where $t_0$ is the normalized start time, N is the number of image patterns, n is a pattern index, (x, y is the active pixel, $\alpha=t_0^2(1-t_0)^2$, $\beta=t_0(1-t_0)$, $P_1(x,y), \ldots, P_N(x,y)$i are the synchronized pixel values of the synchronized image frames corresponding to the active pixel (x, y being estimated, $P_{-1}(x,y)=P_N(x,y)$, $P_{N+1}(x,y)=P_1(x,y)$, $I_1(x,y), \ldots, I_N(x,y)$ are the pixel values of the unsynchronized image frames corresponding to the active pixel (x, y, $I_{-1}(x,y)=I_N(x,y)$.

* * * * *